(12) United States Patent
Kimura (10) Patent No.: US 11,445,113 B2
(45) Date of Patent: Sep. 13, 2022

(54) STABILIZATION CONTROL APPARATUS, IMAGE CAPTURE APPARATUS, AND STABILIZATION CONTROL METHOD

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/904,266

(22) Filed: Jun. 17, 2020

(65) Prior Publication Data

US 2020/0404183 A1    Dec. 24, 2020

(30) Foreign Application Priority Data

Jun. 24, 2019    (JP) .............................. JP2019-116526

(51) Int. Cl.
| | |
|---|---|
| *H04N 5/232* | (2006.01) |
| *H04N 5/345* | (2011.01) |
| *H04N 5/357* | (2011.01) |
| *H04N 5/225* | (2006.01) |
| *G03B 5/00* | (2021.01) |

(52) U.S. Cl.
CPC ..... *H04N 5/23287* (2013.01); *H04N 5/23245* (2013.01); *H04N 5/23254* (2013.01); *H04N 5/3454* (2013.01); *H04N 5/3572* (2013.01)

(58) Field of Classification Search
CPC ........... H04N 5/23245; H04N 5/23254; H04N 5/23209; H04N 5/23287; H04N 5/23274; H04N 5/3454; H04N 5/3572; H04N 5/23296; H04N 5/235; H04N 5/345; G03B 5/00

USPC ........ 348/208.99, 208.4, 208.5, 208.6, 208.7
See application file for complete search history.

(56) References Cited

U.S. PATENT DOCUMENTS

| | | | | |
|---|---|---|---|---|
| 2009/0021633 | A1* | 1/2009 | Fukumoto | H04N 5/772 348/362 |
| 2011/0115929 | A1 | 5/2011 | Noguchi | |
| 2015/0381892 | A1* | 12/2015 | Kim | G06T 7/80 348/208.6 |
| 2017/0309002 | A1* | 10/2017 | Koyano | G03B 17/14 |

FOREIGN PATENT DOCUMENTS

| | | | |
|---|---|---|---|
| EP | 3483651 A1 | | 5/2019 |
| JP | 2004-056581 | * | 2/2004 |
| JP | 2004-056581 | A | 2/2004 |
| JP | 2007-034141 | A | 2/2007 |
| JP | 2007-114311 | A | 5/2007 |
| JP | 2010-117591 | A | 5/2010 |
| JP | 2017-220811 | * | 12/2017 |

* cited by examiner

*Primary Examiner* — Albert H Cutler
(74) *Attorney, Agent, or Firm* — Canon U.S.A., Inc. IP Division (57) ABSTRACT

A stabilization control apparatus that supports a plurality of shooting modes including a first shooting mode and a second shooting mode. The first and second shooting mode have different diagonal-line lengths of an available area of an image sensor. The stabilization control apparatus sets different reference positions of the image sensor depending on which of the first and second shooting modes is set. The reference position is the center of an area within which the image sensor is moved for image stabilization.

16 Claims, 7 Drawing Sheets

STABILIZATION CONTROL APPARATUS, IMAGE CAPTURE APPARATUS, AND STABILIZATION CONTROL METHOD

BACKGROUND

Field of the Disclosure

The present disclosure relates to a stabilization control apparatus that moves an imaging plane of an image sensor in order to perform stabilization during shooting, an image capture apparatus including the stabilization control apparatus, and a stabilization control method.

Description of the Related Art

In recent years, as the performance of image capture apparatuses has increased, an increasing number of image capture apparatuses are equipped with an image stabilization mechanism (imaging-plane stabilization mechanism) that moves an image sensor in a plane perpendicular to an imaging optical system. In order to achieve higher image stabilization performance, a large number of mechanisms including an image stabilization mechanism having a large operation range have been proposed.

In general, an image sensor can output images in a plurality of formats, such as a still image, a video, and the like. Depending on the format, the available area of the image sensor (an area used to form a recording image, which may be also referred to as an available pixel area) usually differs, and the available area of the image sensor usually changes in the same image capture apparatus.

Japanese Patent Laid-Open No. 2007-034141 discloses a technology that limits the movable range of an image stabilization mechanism based on an image circle diameter.

Japanese Patent Laid-Open No. 2010-117591 discloses a technology that performs shooting while shifting an image sensor by using an imaging-plane stabilization mechanism in order to perform tilt-shift shooting, when a user selects tilt-shift shooting.

With these technologies, it is possible to enable a camera to appropriately limit the movable range of an image stabilization mechanism based on an image circle diameter and to enable an imaging-plane stabilization mechanism to operate at a position that is offset based on a user operation. However, none of Japanese Patent Laid-Open Nos. 2007-034141 and 2010-117591 describes performing imaging-plane stabilization in consideration of the fact that the available area of the image sensor changes.

SUMMARY OF THE INVENTION

The present disclosure provides a stabilization control apparatus that can deal with change in the available area of an image sensor and an image capture apparatus including the stabilization control apparatus.

According to an aspect of the present invention, there is provided a stabilization control apparatus comprising at least one processor or circuit, wherein the at least one processor or circuit functions as: a mode setting unit configured to set a shooting mode that is one of a plurality of shooting modes including a first shooting mode and a second shooting mode, the first shooting mode being a mode in which a diagonal-line length of an available area of an image sensor that photoelectrically converts a subject image formed by an imaging optical system is a first value, the second shooting mode being a mode in which the diagonal-line length of the available area is a second value that is smaller than the first value; a reference position setting unit configured to set a reference position that is a position of the image sensor when image stabilization is stopped; and a control unit configured to move the image sensor from the reference position based on a shake, in a plane perpendicular to an optical axis of the imaging optical system, wherein the reference position that is set by the reference position setting unit differs between a time when the first shooting mode is set by the mode setting unit and a time when the second shooting mode is set by the mode setting unit.

According to another aspect of the present invention, there is provided an image capture apparatus comprising: an image sensor that photoelectrically converts a subject image formed by an imaging optical system; at least one processor or circuit functions as: a mode setting unit configured to set a shooting mode that is one of a plurality of shooting modes including a first shooting mode and a second shooting mode, the first shooting mode being a mode in which a diagonal-line length of an available area of the image sensor is a first value, the second shooting mode being a mode in which the diagonal-line length of the available area is a second value that is smaller than the first value; a reference position setting unit configured to set a reference position that is a position of the image sensor when image stabilization is stopped; a control unit configured to move the image sensor from the reference position based on a shake, in a plane perpendicular to an optical axis of the imaging optical system, wherein the reference position that is set by the reference position setting unit differs between a time when the first shooting mode is set by the mode setting unit and a time when the second shooting mode is set by the mode setting unit; and an imaging control unit configured to control image capture by the image sensor, wherein the imaging control unit controls image capture by the image sensor based on the shooting mode set by the mode setting unit.

According to a further aspect of the present invention, there is provided an image capture apparatus comprising at least one processor or circuit, wherein the at least one processor or circuit functions as: an acquisition unit configured to acquire information representing a size of an available area of an image sensor that photoelectrically converts a subject image formed by an imaging optical system; a setting unit configured to set a reference position based on the information representing the size of the available area of the image sensor acquired by the acquisition unit, the reference position being a position of the image sensor when image stabilization is stopped; and a control unit configured to move the image sensor from the reference position based on a shake, in a plane perpendicular to an optical axis of the imaging optical system.

According to another aspect of the present invention, there is provided a stabilization control method comprising: setting a shooting mode that is one of a plurality of shooting modes including a first shooting mode and a second shooting mode, the first shooting mode being a mode in which a diagonal-line length of an available area of an image sensor that photoelectrically converts a subject image formed by an imaging optical system is a first value, the second shooting mode being a mode in which the diagonal-line length of the available area is a second value that is smaller than the first value; setting a reference position that is a position of the image sensor when image stabilization is stopped; and controlling to move the image sensor from the reference position based on a shake, in a plane perpendicular to an optical axis of the imaging optical system, wherein the reference position that is set in the setting of the reference position differs between a time when the first shooting mode is set in the setting of a shooting mode and a time when the second shooting mode is set in the setting of a shooting mode.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but no limitation is made that an invention requires all such features, and multiple such features may be combined as appropriate. Each of the embodiments of the present invention described below can be implemented solely or as a combination of a plurality of the embodiments or features thereof where necessary or where the combination of elements or features from individual embodiments in a single embodiment is beneficial. Furthermore, in the attached drawings, the same reference numerals are given to the same or similar configurations, and redundant description thereof is omitted.

In an embodiment described below, an example in which the present invention is applied to a digital camera with interchangeable lenses, which can perform shooting by attaching a lens unit to the camera, will be described. However, the present invention is applicable to any apparatus that allows an imaging optical system (lens unit) to be replaced and that can reduce an effect on a captured image due to a shake occurring in the image capture apparatus by rotating or translating an image sensor in a plane perpendicular to the optical axis of the imaging optical system. Examples of such apparatuses include a video camera with interchangeable lenses. Hereafter, referring to FIGS. 1 to 6C, an image capture apparatus according to the present embodiment will be described. In each of the figures, the same members will be denoted by the same reference numerals, and redundant descriptions will be omitted.

Figure 2A:
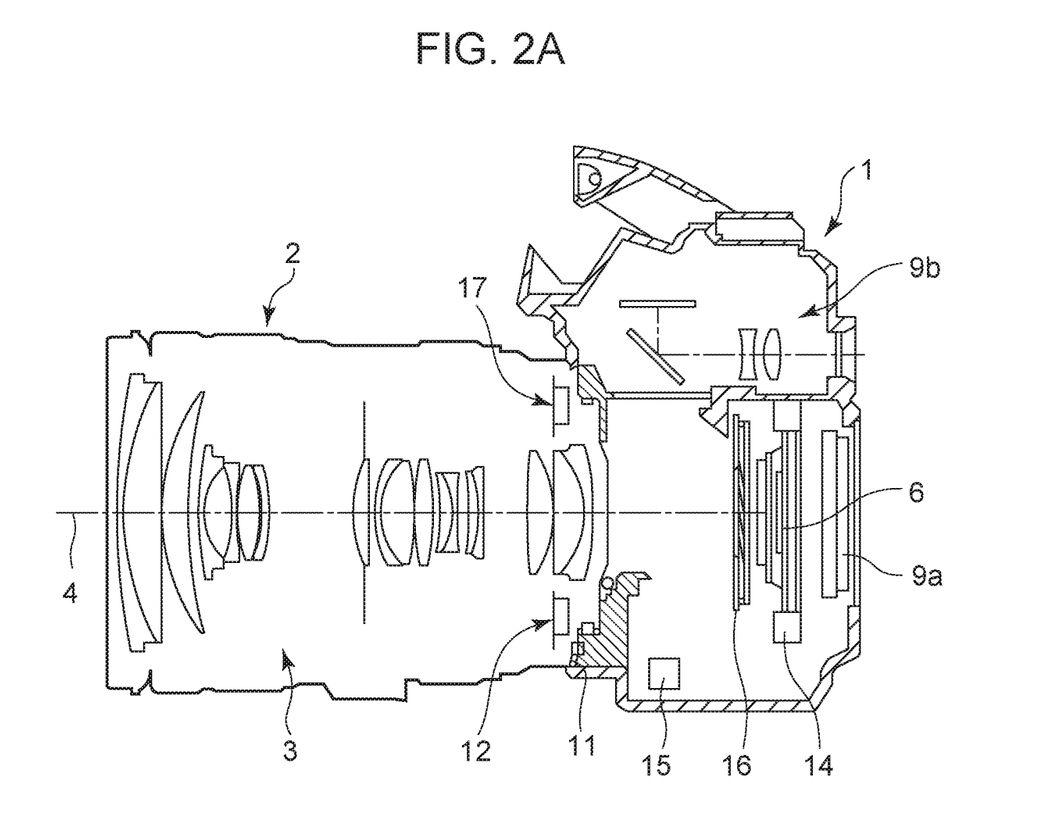
FIG. 2A is a central sectional view of an image capture system according to the present embodiment.
Figure 2B:
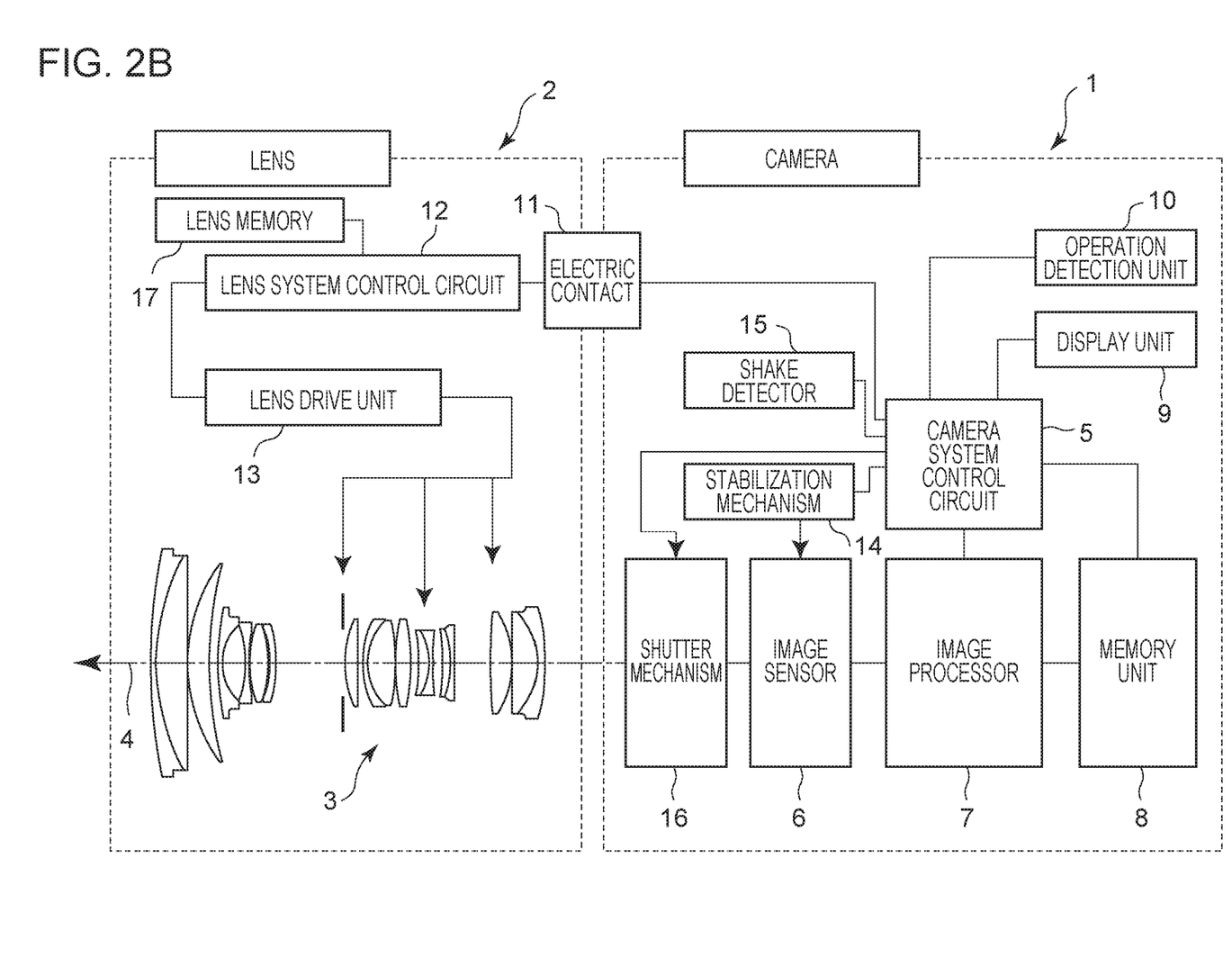
FIG. 2B is a block diagram illustrating the electrical configuration of the image capture system according to the present embodiment.

FIG. 2A is a central sectional view of an image capture system according to the present embodiment, and FIG. 2B is a block diagram illustrating the electrical configuration of the image capture system. Components denoted by the same reference numerals in FIGS. 2A and 2B correspond to each other.

The image capture system illustrated in FIGS. 2A and 2B includes a camera 1 and a lens unit 2 attached to the camera 1. The lens unit 2 is removably attached to the camera 1 via a mount (not shown), and communication of information is performed between the lens unit 2 and the camera 1 via an electric contact 11.

The lens unit 2 includes an imaging optical system 3 composed of a plurality of lenses, a lens drive unit 13 that moves the lenses of the imaging optical system 3, a lens-system control circuit 12 that controls movement of the lenses performed by the lens drive unit 13, and a lens memory 17. The lens memory 17 stores lens information and stores information from the camera 1 acquired via the electric contact 11. The optical axis of the imaging optical system 3 is denoted by the reference numeral 4. The lens drive unit 13 may be constituted by an actuator such as any appropriate motor, and can drive a focusing lens, an image stabilization lens, a diaphragm, and the like that constitute the imaging optical system. The lens-system control circuit 12 may be configured by combining an electric circuit and a processor such as a CPU.

The camera 1 includes a camera system control circuit 5 that controls the operation of the entirety of the camera. The camera 1 includes an image sensor 6 that photoelectrically converts light from the imaging optical system and outputs an image signal, an image processor 7 that generates an image for recording by performing image processing on the image signal, and a memory unit 8 that records the image for recording. The camera 1 includes, as a display unit 9, a rear display device 9a and an electronic view finder (EVF) 9b, and allows a user to perform shooting while checking an image capture range. The rear display device 9a is a touch panel and is connected to an operation detection unit 10. The camera system control circuit 5 may be configured by combining an electric circuit and a processor such as a CPU.

The camera 1 includes an operation member (not shown). When detecting an operation of the operation member, the operation detection unit 10 outputs an operation signal to the camera system control circuit 5. The camera system control circuit 5 can capture a still image and a video by performing image capture control by controlling the operations of various parts of the camera 1 based on the input operation signal. That is, the operation detection unit 10 functions as a shooting instruction input unit that receives a shooting preparation instruction and a shooting instruction from a user.

Moreover, the camera 1 includes a stabilization mechanism 14 that can translate and rotate the image sensor in a plane (xy-plane) perpendicular to an optical axis 4 of the imaging optical system 3, a shake detector 15 that detects a shake applied to the camera 1, and a shutter mechanism 16. The stabilization mechanism 14 is a mechanism that includes an actuator such as any appropriate motor that can translate the image sensor 6 from a reference position in the xy-plane and can rotate the image sensor 6 around the z-axis (the direction parallel to the optical axis). Details of the structure of the stabilization mechanism 14 will be described below.

The shake detector 15 can detect a rotational shake of the device. In the present embodiment, it is assumed that the shake detector 15 detects rotational shakes (pitch, yaw, and roll) around axes perpendicular to the optical axis 4 (x-axis, y-axis) and an axis parallel to the optical axis 4 (z-axis). As the shake detector 15, a vibration gyro sensor that detects an angular velocity or the like can be used. FIG. 2B is a block diagram illustrating the electrical configuration of the image capture system. The image capture system is composed of the camera 1 and the lens unit 2 and constitutes an image capture unit, an image processing unit, a recording/reproducing unit, and a control unit. The image capture unit includes the imaging optical system 3, the image sensor 6, and the shutter mechanism 16. The image processing unit includes the image processor 7. The recording/reproducing unit includes the memory unit 8 and the display unit 9 (the rear display device 9a and the EVF 9b). The control unit includes the camera system control circuit 5, the operation detection unit 10, the lens-system control circuit 12, the lens drive unit 13, the stabilization mechanism 14, and the shake detector 15.

The image capture unit is an optical processing system that forms an image of light from an object on the imaging surface of the image sensor 6 via the imaging optical system 3. Because a focus evaluation value/appropriate exposure value can be obtained from the image sensor 6, the imaging optical system 3 is appropriately adjusted based on the signal. Thus, the image sensor 6 is exposed to object light with an appropriate light amount, and a subject image is formed in the vicinity of the image sensor 6.

The image sensor 6 can output images of a plurality of formats, such as a still image and a video. A video further has a plurality of formats, and, in accordance with the aspect ratio and the like, and the size of an available area on the image sensor (a region used to generate an image to be recorded) changes. Regarding a still image, it is possible to perform crop shooting that generates an image from a signal of only a partial area on the image sensor. Also in crop shooting, it can be said that the available area on the image sensor changes compared with a case where cropping is not performed. Thus, the camera 1 can perform a plurality of shooting operations, such as a video, a still image, and crop shooting, that differ from each other in the size of the available area of the image sensor 6 based on control by the camera system control circuit 5. These will be referred to as "shooting modes". As the available area changes, the read-out area from the image sensor 6 may change; or, without changing the read-out area from the image sensor, the available area may be changed by causing the image processor 7 to select a part of an input signal. As in the latter case, even when the read-out area from the image sensor is not changed, because an area used to generate an image for recording differs, image capturing is performed in shooting modes that differ from each other in the available area of the image sensor. The camera system control circuit 5 can also function as a setting unit that sets a shooting mode. The shutter mechanism 16 controls whether or not a subject image reaches the image sensor 6 by moving a shutter curtain. The shutter mechanism 16 according to the present embodiment includes a curtain (mechanical second curtain) that blocks at least a subject image, and finishing of exposure is performed by the shutter mechanism 16. In the present embodiment, the image sensor 6 has a mode (electronic first curtain) that controls timing of starting exposure by resetting charges for each line before the shutter mechanism 16 moves the second curtain. In the electronic first curtain mode, exposure control is performed by synchronously operating charge resetting (electronic first curtain) of the image sensor 6 and the second curtain of the shutter mechanism 16.

The image processor 7 of the image processing unit includes an A/D converter, a white balance adjustment circuit, a gamma-correction circuit, an interpolation computing circuit, and the like, and can generate an image for recording. A color interpolation processing unit, which is included in the image processor 7, generates a color image by performing color interpolation (de-mosaicking) from a signal of a Bayer pattern. The image processor 7 compresses an image, a video, an audio, and the like by using a predetermined method.

The recording/reproducing unit records and reproduces an image for recording made by the image processor 7. The memory unit 8 includes a non-volatile memory and controls storing of an image in an image storage unit (not shown), which is a non-volatile memory. As the image storage unit, a recording medium insertable and removable from the camera 1 may be used. The camera system control circuit 5 performs output to the image storage unit of the memory unit 8 and displays an image to be seen by a user on the display unit 9.

The lens memory 17 and the memory unit 8 have non-volatile memories that respectively store information of the lens unit 2 and information of the camera 1. The lens memory 17 of the lens unit 2 may have optical information such as information regarding the optical axis of the imaging optical system 3 and the available area of a light beam (=the range to which light sufficiently reaches). If the lens memory 17 does not have the information, for example, based on measurement at a service center or measurement in the field, information regarding the optical axis of the imaging optical system and the available area of a light beam is saved beforehand in the memory unit 8 of the image capture apparatus. The optical information regarding these is used instead of optical information acquired from the lens memory 17. Measurement in the field is performed, for example, in a state in which a user is capturing an image of an object that is close to a uniform luminance surface (such as the sky) by using a camera fixed to a tripod. To be more specific, a plurality of images may be captured while the stabilization mechanism 14 changes the position of the image sensor 6, and a center such that the light amount becomes the optimum (=a position that can be regarded as the optical axis) in comparison with the light-amount profile of the lens and the available area of the light beam may be decided. By doing so, information regarding the lens optical axis and the available area of a light beam can be obtained from either of the lens memory 17 and the memory unit 8. That is, either of the lens memory 17 and the memory unit 8 functions as an optical axis information storing unit that stores information representing the optical axis of the imaging optical system 3.

In accordance with an operation by a user, the control unit controls the entirety of the image capture system and controls a shooting operation including image stabilization. The camera system control circuit 5 generates and outputs a timing signal during image capture and the like. In response to an external operation, the camera system control circuit 5 controls each of the image capture system, the image processing system, and the recording/reproducing system. For example, when the operation detection unit 10 detects pressing of a shutter release button (not shown), the camera system control circuit 5 controls an image capture process by the image sensor 6, movement of the image sensor by the stabilization mechanism 14, and compression by the image processor 7, thereby controlling a shooting operation including image stabilization. Moreover, the camera system control circuit 5 controls states of segments of the information display device that performs information display by using the display unit 9.

An adjustment operation performed by the control system to adjust the optical system will be described. The image processor 7 is connected to the camera system control circuit 5, and the image processor 7 obtains appropriate focal position and f-number based on a signal from the image sensor 6. That is, the camera system control circuit 5 performs photometric and range finding operations based on a signal of the image sensor 6, and decides exposure conditions (an f-number, a shutter speed, and the like). That is, the camera system control circuit 5 functions as an exposure controller and a focal-point detector of the camera 1. The camera system control circuit 5 issues a command to the lens-system control circuit 12 via the electric contact 11, and the lens-system control circuit 12 appropriately controls the lens drive unit 13. Thus, the focal position is adjusted to focus on a main subject image.

Moreover, in a mode that performs image stabilization by moving the image stabilization lens, the image stabilization lens may be appropriately controlled via the lens drive unit 13, based on a signal obtained from the image sensor 6 described below and a shake signal detected by the shake detector 15. The lens unit 2 may have a shake detector, and the image stabilization lens may be controlled based on a shake signal detected by the shake detector.

The camera system control circuit 5 functions as a correction-amount acquisition unit that acquires a correction amount for correcting an image blur generated by a shake applied to the camera 1 based on a detection signal from the shake detector 15. Moreover, the camera system control circuit 5 controls movement of the image sensor 6 performed by the stabilization mechanism 14 based on the acquired correction amount. That is, the camera system control circuit 5 controls the stabilization mechanism 14, and performs stabilization control by moving the image sensor 6 from the reference position of the image sensor by the correction amount. The reference position is the center of the movement range of the image sensor, and is the position of the image sensor when the correction amount is 0 (that is, when the image sensor is fixed and image stabilization is stopped).

When the operation detection unit 10 detects an operation performed by a user to push a shutter release button (not shown) by half and prepare for shooting, the camera system control circuit 5 performs image stabilization by controlling the stabilization mechanism 14 to make it easier for the user to determine composition. That is, the camera system control circuit 5 acquires a correction amount based on a signal from the shake detector 15, and performs image stabilization by controlling the stabilization mechanism 14 based on the acquired correction amount. Subsequently, when the operation detection unit 10 detects that the shutter release button is completely pushed down, the camera system control circuit 5 performs image stabilization in order to stabilize a subject image obtained by performing main exposure by using the stabilization mechanism 14. Image stabilization is stopped when a predetermined time has elapsed after exposure. Thus, a stabilization operation is performed by the shake detector 15, the stabilization mechanism 14 that moves the image sensor, and the camera system control circuit 5 that generates a target value of the stabilization mechanism 14 based on a signal of the shake detector 15 and performs movement control of the image sensor.

Figure 3:
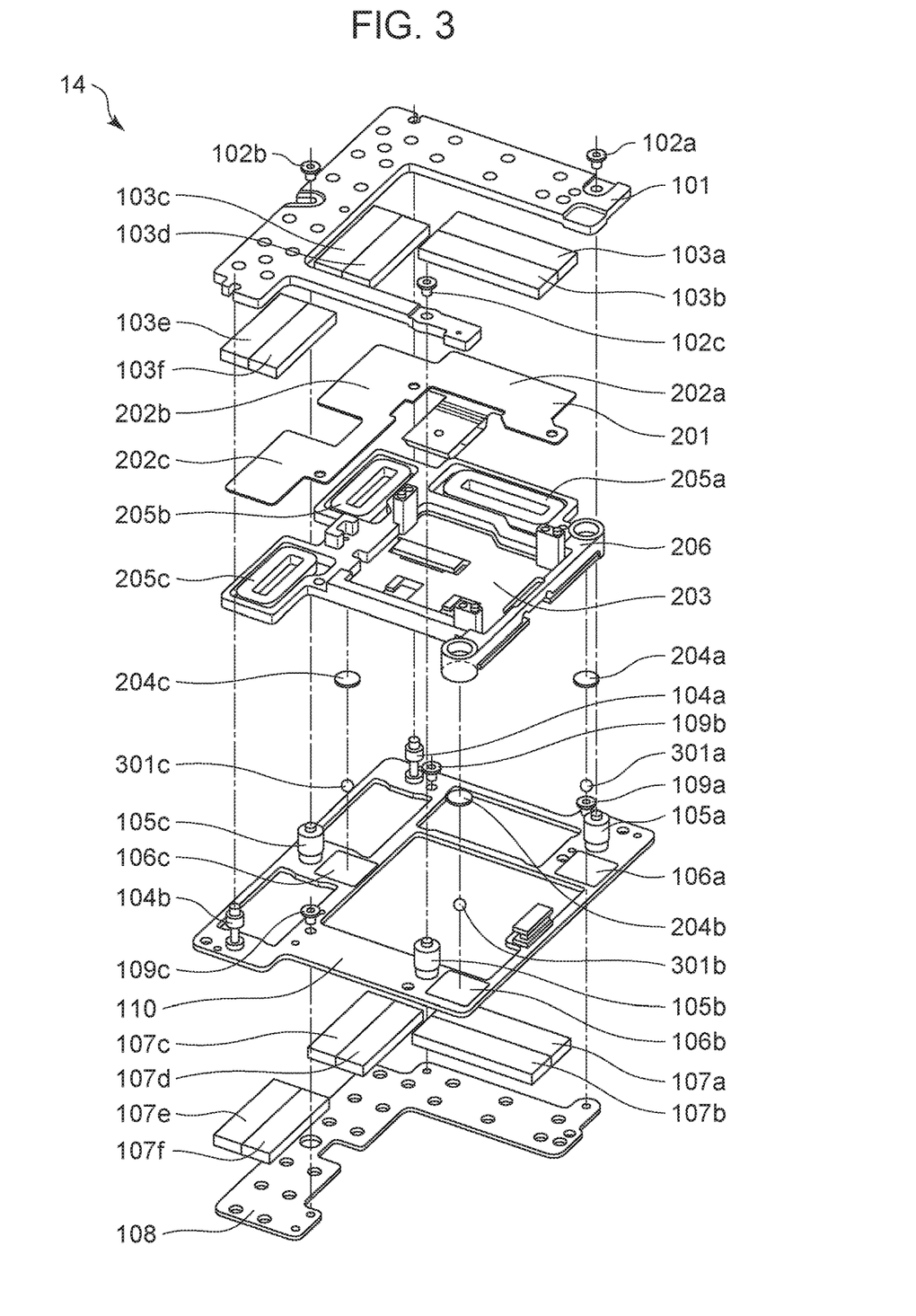
FIG. 3 is an exploded perspective view of a stabilization mechanism according to the present embodiment.

Referring to FIG. 3, the configuration of the stabilization mechanism 14 according to the present embodiment will be described. FIG. 3 is an exploded perspective view of the stabilization mechanism 14. For simplicity, an electric mechanism for performing control is not illustrated. In FIG. 3, the vertical lines are lines parallel to the optical axis 4 of the imaging optical system 3. In FIG. 3, members denoted by reference numerals 101 to 110 are members that do not move (fixed members), and members denoted by reference numerals from 201 to 206 are members that move (movable members). Members denoted by reference numerals 301a to 301c are balls that are interposed between fixed members and movable members.

In FIG. 3, an upper yoke 101; upper magnets 103a, 103b, 103c, 103d, 103e, and 103f; lower magnets 107a, 107b, 107c, 107d, 107e, and 107f; and a lower yoke 108 form a magnetic circuit and constitute a closed magnetic path. The upper magnets 103a, 103b, 103c, 103d, 103e, and 103f are fixed, with adhesive, in a state of being attracted to the upper yoke 101. The lower magnets 107a, 107b, 107c, 107d, 107e, and 107f are fixed, with adhesive, in a state of being attracted to the lower yoke 108. The upper magnets 103a, 103b, 103c, 103d, 103e, and 103f and the lower magnets 107a, 107b, 107c, 107d, 107e, and 107f are each magnetized in the optical axis direction (the up-down direction in FIG. 3). Adjacent magnets (for example, the upper magnets 103a and 103b) are magnetized in opposite directions. Facing magnets (for example, the upper magnet 103a and the lower magnet 107a) are magnetized in the same direction. Thus, strong magnetic flux density is generated between the upper yoke 101 and the lower yoke 108 in the optical axis direction.

Because strong attraction occurs between the upper yoke 101 and the lower yoke 108, main spacers 105a, 105b, and 105c and auxiliary spacers 104a and 104b are disposed so that the upper yoke 101 and the lower yoke 108 are separated by an appropriate distance. The appropriate distance is a distance that can provide appropriate spaces between the upper magnets and the lower magnets when coils 205a, 205b, and 205c and an FPC 201 are disposed between the upper magnets and the lower magnets. The main spacers 105a, 105b, and 105c each has a screw hole, and the upper yoke 101 is fixed to the main spacers 105a, 105b, and 105c by using screws 102a, 102b, 102c. On the body portions of the main spacers 105a, 105b, and 105c, rubber members that form mechanical end portions, which are stoppers, of the movable members are disposed. The yoke 108 is fixed to a base plate 110 via screws 109a, 109b, and 109c. In the base plate 110, holes are formed so as to avoid the lower magnets 107a to 107f. The lower magnets 107a, 107b, 107c, 107d, 107e, and 107f, each of which has a thickness larger than that of the base plate 110, protrude from the holes formed in the base plate 110.

A movable frame 206 is made of a die-cast magnesium alloy or a die-cast aluminum alloy and has low weight and high rigidity. Each element of a movable unit is fixed to the movable frame 206. Position sensors are attached to positions 202a, 202b, and 202c of the FPC 201. In the present embodiment, for example, Hall elements are used as the position sensors, so that positions can be detected by using the aforementioned magnetic circuit. Because the Hall elements are small, the Hall elements are disposed so as to be nested in the wound wires of the coils 205a, 205b, and 205c. The image sensor 6, the coils 205a, 205b, and 205c, and the Hall elements are connected to a movable PCB 203. These members exchange electric signals with the outside via connectors on the movable PCB 203.

Fixed-portion rolling plates 106a, 106b, and 106c are fixed to the base plate 110 with adhesive. Movable member rolling plates 204a, 204b, and 204c are fixed to the movable frame 206 with adhesive. The fixed-portion rolling plates 106a, 106b, and 106c and the movable member rolling plates 204a, 204b, and 204c form rolling surfaces of balls 301a, 301b, and 301c. Thus, by independently providing the rolling plates, it become easy to design surface roughness and hardness in a desirable state.

With the configuration described above, by supplying electric currents to the coils 205a, 205b, and 205c, a force in accordance with the Fleming's left-hand rule is generated, so that the movable members can be moved. Feedback control can be performed by using signals of the Hall elements. By appropriately controlling the values of the signals of the Hall elements, the movable frame 206 can be translated and rotated in the roll direction in a plane perpendicular to the optical axis 4 of the imaging optical system 3. By driving signals of the Hall elements attached to the positions 202b and 202c in the opposite phase while keeping a signal of the Hall element attached to the position 202a to be constant, rotational motion around the optical axis 4 of the imaging optical system 3 can be generated. Therefore, the movable frame 206 can be rotated around the optical axis 4 of the imaging optical system 3.

At the positions 202a, 202b, and 202c, magnetic flux density in the optical axis direction is detected. The characteristic of the magnetic circuit formed by the upper magnets 103a, 103b, 103c, 103d, 103e, and 103f, the lower magnets 107a, 107b, 107c, 107d, 107e, and 107f, and the like is generally non-linear. Therefore, magnetic flux density detected at the positions 202a, 202b, and 202c does not necessarily have a constant resolution in the entirety of the movement range (detection resolution changes). To be specific, there is a position where change of magnetic flux density is sharp and a position where change of magnetic flux density is gentle, and detection resolution is higher (the change of magnetic flux density relative to the movement amount is larger) at a position where the change is sharper. In the magnetic circuit described above, change of magnetic flux density is the largest and the detection resolution is high at the boundary position between magnets (for example, the boundary position between the upper magnets 103a and 103b).

Figure 4A:
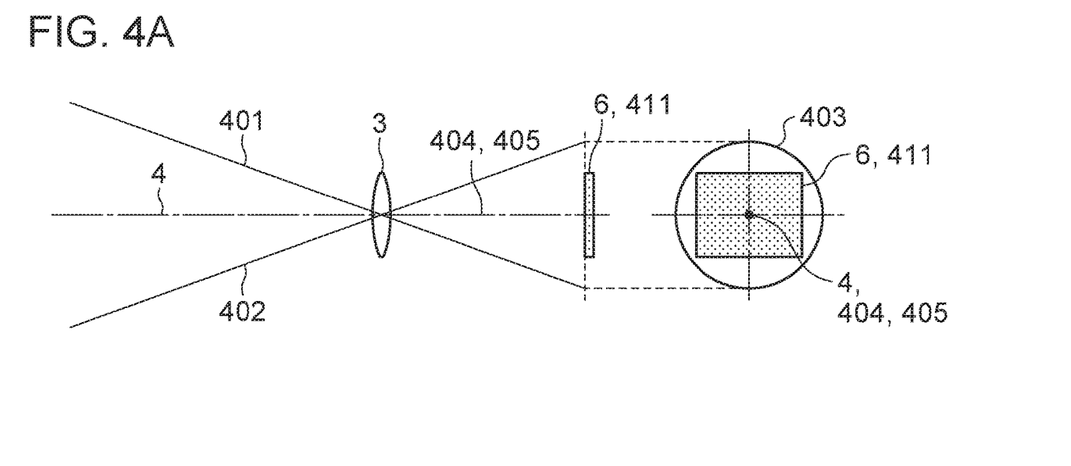
FIGS. 4A to 4C illustrate the relationship between vignetting when the stabilization mechanism according to the present embodiment operates and the shooting mode.
Figure 4B:
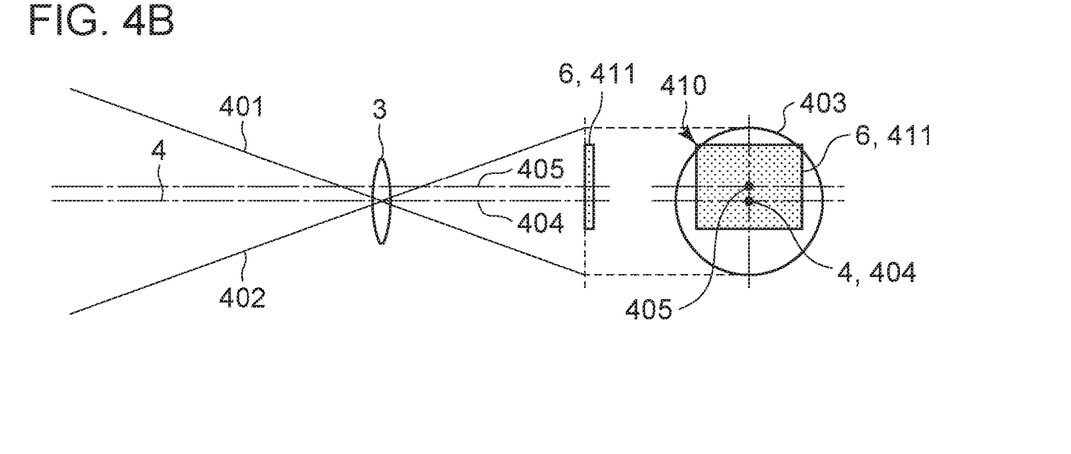
Figure 4C:
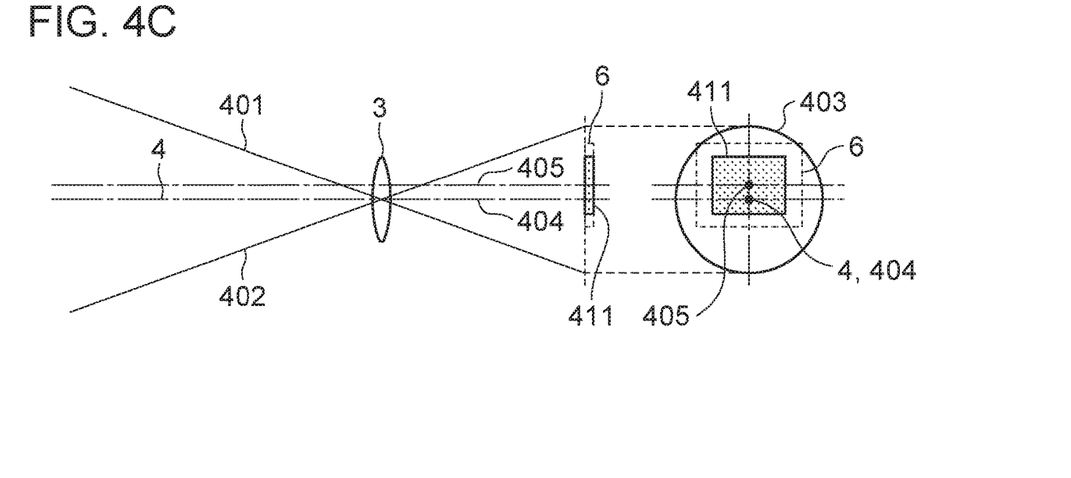

Referring to FIGS. 4A to 4C, the relationship between vignetting and the available area of the image sensor when the stabilization mechanism 14 operates will be described. FIGS. 4A to 4C illustrate the relationship between the available area of the image sensor and vignetting when the image sensor 6 is disposed at a first reference position and when a mount center 404, the center 405 of the available area of the image sensor, and the optical axis 4 coincide in a plane (xy-plane) perpendicular to the optical axis.

FIG. 4A illustrates a state in which the image sensor 6 is not moved by the stabilization mechanism 14, that is, a state in which the image sensor is disposed at the first reference position. FIG. 4B illustrates a state in which the image sensor 6 has been moved by the stabilization mechanism 14, and FIG. 4C illustrates a state in which an available area 411 of the image sensor has changed with the same movement of the image sensor 6 as FIG. 4B. FIGS. 4A to 4C each illustrate a set of two projection views. On the left side, a projection view in the same direction as FIG. 2A (that is, a direction perpendicular to the optical axis) is illustrated; and on the right side, a projection view from the optical axis direction is illustrated (that is, a first angle projection view). In FIGS. 4A to 4C, the imaging optical system 3 is schematically illustrated with one convex lens.

As illustrated in FIG. 4A, in the case where the image sensor is disposed at the reference position, the available area 411 of the image sensor is designed so as to be disposed in outlines 401 and 402 that represent the available area of a light beam that reaches from the imaging optical system 3.

Thus, the available area 411 of the image sensor is disposed in an image circle 403 that represents the available area of the light beam. That is, as long as the imaging optical system 3 is adapted to the image sensor 6 having the size of 24 mm×36 mm, which is called a full size, the radius of the image circle 403 is designed to be larger than the maximum image height of a full size image, which is 21.63 mm $(=(12^2+18^2)^{1/2})$. In this state, inappropriate vignetting and the like do not occur.

Here, a case where the image sensor 6 has moved by a large distance by the stabilization mechanism 14 will be considered. FIG. 4B illustrates this case. In contrast to FIG. 4A, the image sensor 6 has moved upward along the plane of figure in FIG. 4B. Although the center 405 of the available area of the image sensor coincides with the optical axis 4 and the mount center 404 in FIG. 4A, the center 405 is displaced upward in FIG. 4B. At this time, as illustrated in the projection view on the right side in FIG. 4B, depending on the movement amount, the available area 411 of the image sensor may move to the outside of the image circle 403. Large vignetting occurs in an area 410 of the available area, which is outside of the image circle. Therefore, as described in Japanese Patent Laid-Open No. 2007-034141, in order to prevent the area 410 from being generated, it is desirable that the movement range of the image sensor (available area) be changed based on the diameter of the image circle.

Next, a case where the available area 411 of the image sensor 6 has changed will be considered. FIG. 4C illustrates this case. In contrast to FIG. 4B, in FIG. 4C, the available area 411 of the image sensor 6 has changed from the entirety of the image sensor to a partial area of the image sensor, and accordingly the diagonal-line length of the available area 411 has been reduced. The diagonal-line length of the available area 411 in FIG. 4A and FIG. 4B will be referred to as a "first value", and the diagonal-line length of the available area 411 in FIG. 4C will be referred to as a "second value". A still image shooting mode using a partial area on the image sensor 6 (crop shooting mode) and a video shooting mode are in such a state. This is because, since the aspect ratio in video shooting is generally 16:9, the format may differ from the format of a still image (3:2 for full size), or an appropriate range may be set as the available area 411 in accordance with the resolution (HD, FHD, 4K, or the like) and the data rate. Thus, during video shooting, an area on the image sensor 6 that is smaller than that in still-image shooting (that is not crop shooting) is generally used. As can be clearly seen by comparing FIG. 4B with FIG. 4C, because the available area 411 is smaller, the area 410 in which large vignetting occurs is not present even through the movement amount of the image sensor 6 is the same, and large vignetting does not occur. That is, the state of vignetting changes in accordance with the available area 411 of the image sensor 6.

Referring to FIGS. 5A to 5D, a case where the optical axis 4 of the imaging optical system 3 is offset due to a manufacturing error in the lens unit or the like will be considered. FIGS. 5A to 5D each illustrate the relationship between the available area of the image sensor and vignetting in a case where the optical axis 4 is offset in the rightward-upward direction in the plane of the figure and the optical axis 4 does not coincide with the mount center 404. FIGS. 5A to 5D are illustrated in the same way as FIGS. 4A to 4C.

Figure 5A:
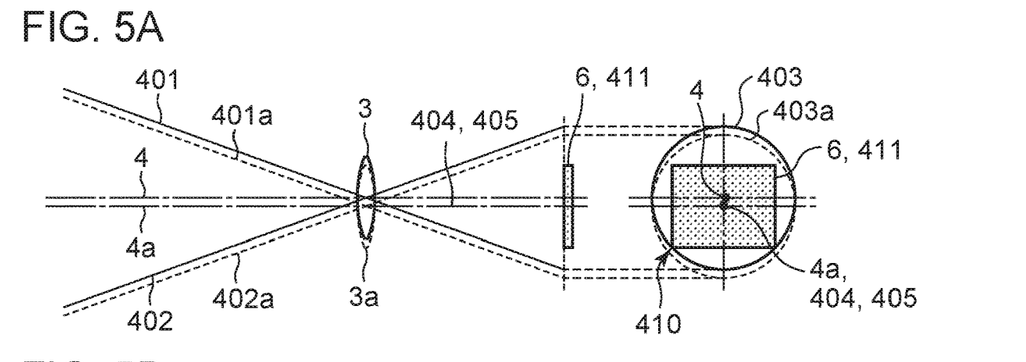
FIGS. 5A to 5D illustrate appropriate center position for the shooting mode in a case where the optical axis of the imaging optical system is offset.
Figure 5B:
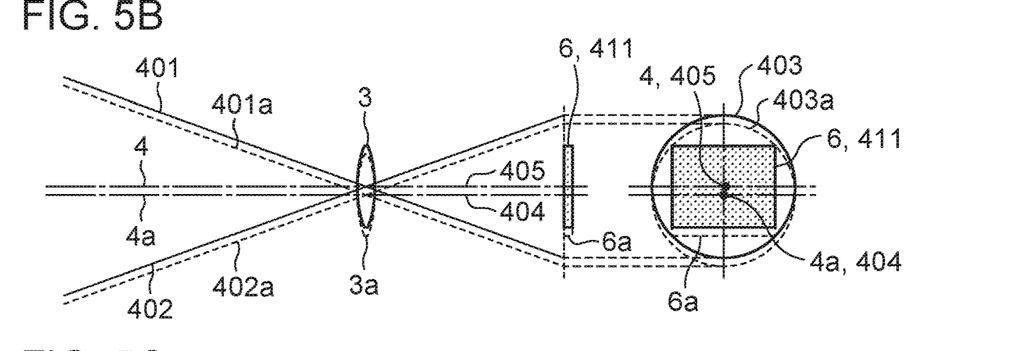
Figure 5C:
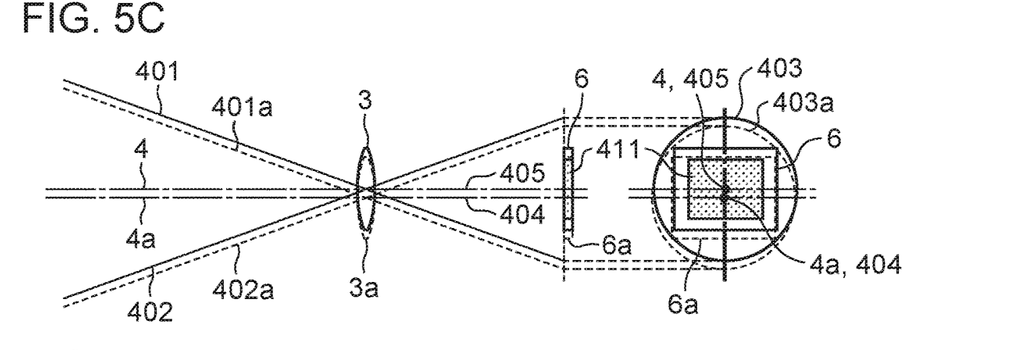
Figure 5D:
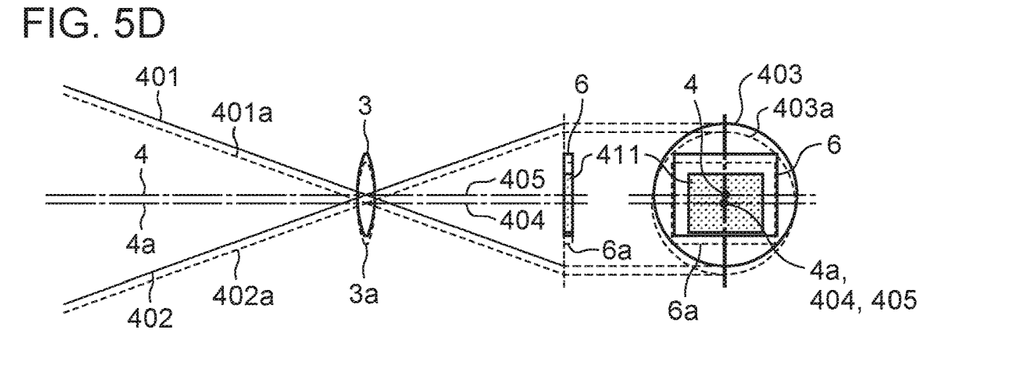

FIG. 5A illustrates a state in which the image sensor 6 is disposed so that the center 405 of the available area 411 coincides with the mount center 404, that is, a state in which the image sensor 6 is disposed at the first reference position as in FIG. 4A. FIG. 5B illustrates a state in which the available area 411 of the image sensor 6 is moved from the state shown in FIG. 5A so that vignetting is resolved. FIG. 5C illustrates a state in which the available area 411 of the image sensor 6 has changed from the state shown in FIG. 5B. FIG. 5D illustrates a state in which the position of the image sensor 6 is the first reference position as in FIG. 5A and the available area 411 of the image sensor 6 has changed.

In FIGS. 5A to 5D, an imaging optical system 3a in a case where there is no manufacturing error or the like (a case where the optical axis is not offset) is schematically shown by a convex lens. The optical axis 4a of the imaging optical system 3a, outlines 401a and 402a that represent the available area of a light beam, and an image circle 403a in a case where the optical axis is not offset are respectively illustrated independently from the imaging optical system 3, the optical axis 4, the outlines 401 and 402, and the image circle 403 in a case where the optical axis is offset.

In the example shown in FIG. 5A, the available area of the image sensor 6 is positioned at the first reference position; and the designed optical axis 4a, the center 405 of the available area of the image sensor, and the mount center 404 coincide on the xy-plane. On the other hand, the real optical axis 4 is offset rightward and upward as viewed from the optical axis direction, and a part (the area 410) of the image sensor 6 has moved outside of the image circle 403. Therefore, large vignetting occurs. The optical axis is illustrated so to be extremely offset for ease of description in the example in FIG. 5A, and a real manufacturing error is much smaller. However, a phenomenon in which a peripheral image is darker or a phenomenon in which brightness in an image is nonuniform may occur.

Here, a case where the image sensor 6 is moved by the stabilization mechanism 14 will be considered. FIG. 5B illustrates a case where the available area 411 of the image sensors has moved from the first reference position to the second reference position by moving the image sensor by using the stabilization mechanism 14. In contrast to FIG. 5A, in FIG. 5B, the available area 411 of the image sensor 6 moves in the rightward-upward direction. That is, the available area 411 of the image sensor 6 moves so as to follow the optical axis 4 so that the optical axis 4 and the center 405 of the available area of the image sensor coincide. Thus, all of the available area 411 of the image sensor 6 can be positioned inside the image circle 403. Moreover, the difference between the available area 411 of the image sensor 6 and the image circle 403 can be utilized for stabilization. The relationship between these will be described below with reference to FIGS. 6A to 6C.

Next, a case where the available area 411 of the image sensor 6 has been changed will be considered. In FIG. 5C, the available area 411 of the image sensor 6 is small compared with FIG. 5B. At this time, the center 405 of the available area of the image sensor coincides with the optical axis 4, because the state shown in FIG. 5B is the reference.

On the other hand, when the available area 411 is small, it is not necessary that the center 405 of the available area of the image sensor coincide with (or be made closer to) the optical axis 4. FIG. 5D illustrates a case where the center 405 of the available area of the image sensor is maintained at the mount center 404. In other words, in FIG. 5D, the available area 411 of the image sensor 6 is small, compared with FIG. 5A. As can be clearly seen from FIG. 5D, because the available area 411 is small, all of the available area 411 of the image sensor 6 is positioned inside the image circle 403. On the other hand, in consideration of some functions of the camera, there are cases where a state other than that of FIG. 5C is more desirable. An example of such a case is nonuniform exposure or exposure precision that occurs when the image sensor 6 is moved by the stabilization mechanism 14 in a case where image capturing is performed by using a combination of the first curtain (electronic first curtain) by electrical resetting and the second curtain (mechanical second curtain) by mechanical light-blocking. The term "nonuniform exposure" refers to nonuniformity of in-plane brightness of an image, and the term "exposure precision" refers to deviation of the entire brightness in an image. When performing shooting by using the electronic first curtain and the mechanical second curtain, in order to reduce nonuniform exposure, the movement characteristic of the electronic first curtain is adjusted to the movement characteristic of the mechanical second curtain. However, this adjustment is performed with respect to the movement characteristic of the mechanical second curtain when the available area 411 of the image sensor 6 is positioned at a predetermined position. Thus, for example, if the predetermined position is a position such that the center of the available area coincides with the mount center (that is, the first reference position), the movement characteristic of the electronic first curtain and the movement characteristic of the mechanical second curtain differ from each other because the center of the available area moves in the shutter-movement direction, and in particular nonuniform exposure occurs during high-speed shutter. The larger the movement amount, the larger the deviation of movement characteristic. Thus, nonuniform exposure can be reduced by setting the reference position of stabilization control at the first reference position, which coincides with a predetermined position that is the reference when adjusting the movement characteristic of the shutter, than at the second reference position, where the center 405 of the available area of the image sensor and the optical axis 4 coincide. Nonuniform exposure can be reduced by setting a position that is not the first reference position to the reference position, as long as the position is closer to the predetermined position than the second reference position.

As illustrated in FIG. 5C and FIG. 5D, there is a case where the necessity to consider offsetting of the optical axis 4 and the image circle 403 is low when the available area 411 of the image sensor 6 is considered. In such a case, a position that is favorable for another camera function may be set as the center when moving the available area of the image sensor by using the stabilization mechanism 14. (There may be a case where the position shown in FIG. 5D is more favorable than the position shown FIG. 5C.)

Figures 6A, 6B:
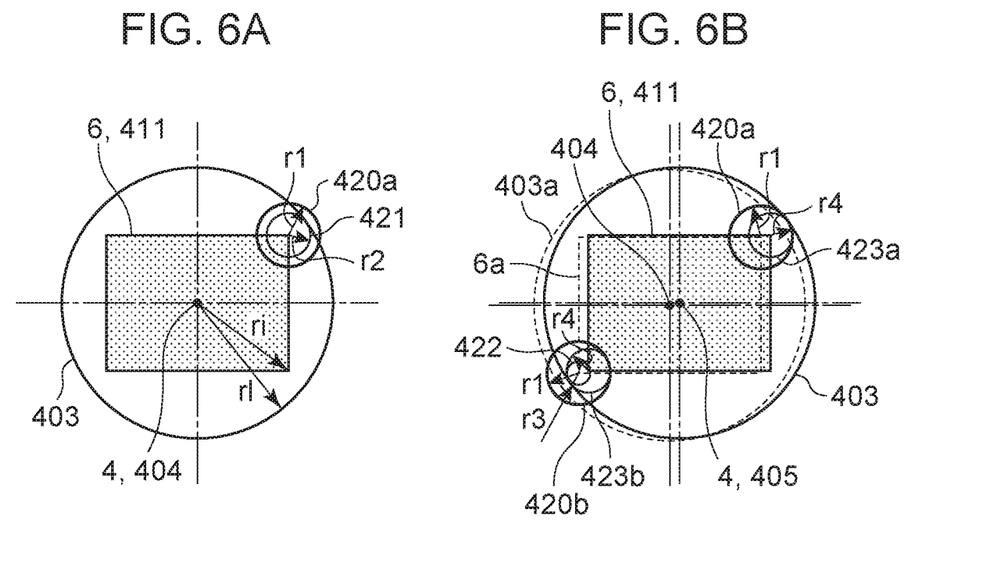
FIGS. 6A to 6C illustrate the relationship between the effect of referring to the optical axis of the imaging optical system and an available area.
Figure 6C:
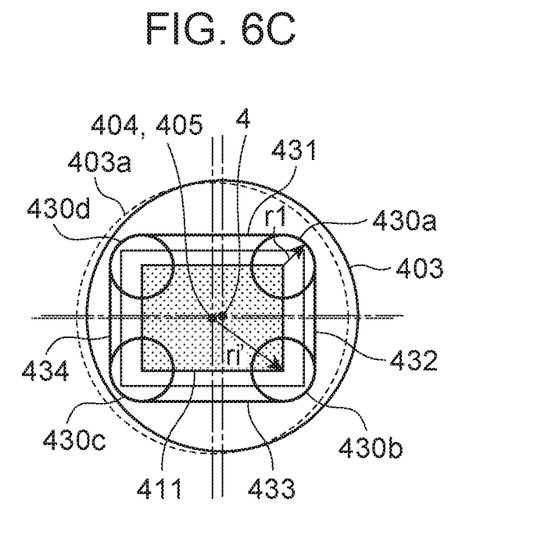

Referring to FIGS. 6A to 6C, the relationship between the effect of referring to the optical axis of the imaging optical system and the available area will be described, and in addition, the movement range of the stabilization mechanism 14 will be described.

FIGS. 6A to 6C are projection views of the image sensor 6 and the image circle 403 as viewed from the optical axis direction. FIG. 6A illustrates a state in which the optical axis 4 is not offset, which corresponds to the state shown in FIG. 4A. FIG. 6B illustrates a state in which the optical axis 4 is offset and the center 405 of the available area of the image sensor is moved in accordance with the optical axis, which corresponds to the state shown in FIG. 5B. FIG. 6C illustrates an example in which the center 405 of the available area of the image sensor and the mount center 404 are made to coincide and the size of the available area 411 of the image sensor 6 is reduced, which corresponds to the state shown in FIG. 5D.

In FIGS. 6A to 6C, circles 420a, 420b, 430a, 430b, 430c, and 430d each represent a range to which the available area 411 of the image sensor 6 can reach (referred to as the movable range of the stabilization mechanism 14) by the movement of the stabilization mechanism 14, which is determined in accordance with the configuration of the stabilization mechanism 14. In FIG. 6A, a circle 421 is a circle that is centered on a corner of the available area 411 of the image sensor 6 when the image sensor 6 is positioned at the first reference position, and is a circle that is inscribed in the image circle 403. Within this range, even when the image sensor 6 moves, the available area 411 does not move to the outside from the image circle 403. As a result, the circle 421 represents the movable range of the corner of the available area 411 of the image sensor 6 (referred to as "the movable range of the available area 411") during stabilization.

In FIG. 6B, a circle 422 is a circle that is centered on a corner of an image sensor 6a when the available area 411 of the image sensor 6 is positioned at the first reference position, and is a circle that is inscribed in the image circle 403 that is offset due to a manufacturing error. The circle 422 represents the movable range of the available area 411 when the reference position of stabilization control is the first reference position. Circles 423a and 423b are circles that are centered on a corner of the image sensor 6 when the available area 411 of the image sensor 6 is the second reference position, and are circles that are inscribed in the image circle 403 that is offset due to a manufacturing error. The circles 423a and 423b represent the movement range of the available area 411 when the reference position of stabilization control is determined as the second reference position in accordance with offsetting of the optical axis 4. Straight lines 431, 432, 433, and 434 are respectively a line that is tangent to circles 430a and 430d, a line tangent to circles 430a and 430b, a line tangent to circles 430b and 430c, and a line tangent to circles 430c and 430d. Ranges surrounded by the straight lines 431, 432, 433, and 434 and the circles 430a, 430b, 430c, and 430d are ranges to which the available area 411 of the image sensor 6 may be moved by the stabilization mechanism 14.

r1 represents the movement range of the image sensor 6 during stabilization and corresponds to the radius of the circles 420a, 420b, 430a, 430b, 430c, and 430d. r2 is the radius of the circle 421. r3 is the radius of the circle 422. r4 is the radius of the circles 423a and 423b. ri is the diagonal-line length of the available area 411 of the image sensor 6. r1 is the radius of the image circle. ri' is the diagonal-line length of the available area of the image sensor 6 after the available area is changed.

Referring to FIG. 6A, a case where the optical axis 4 is not offset, and the optical axis 4, the center 405 of the available area of the image sensor, and the mount center 404 coincide on the image sensor will be considered. When the optical axis 4, the center 405 of the available area of the image sensor, and the mount center 404 coincide on the image sensor, the radius r2 of the movement range of the available area 411 of the image sensor during stabilization is the difference between the radius diameter r1 of the image circle and the diagonal-line length ri of the available area 411 (r2=r1−ri). This indicates that the margin (r2) between the image circle and the available area 411 of the image sensor 6 can be utilized for stabilization. It is assumed that the stabilization mechanism is designed to be movable in a larger range and r1>r2.

Next, referring to FIG. 6B, a case where the optical axis 4 is offset will be considered. First, a case where the optical axis 4 and the center 405 of the available area of the image sensor are not made to coincide, that is, a case where the reference position of the image sensor 6 is the first reference position will be considered. At this time, the movable range of the available area 411 is represented by the circle 422 (radius: r3). It is clear that r3<r2, and it can be seen that, when the available area is moved so that the available area 411 is not positioned outside of the image circle 403, the size of a range that can be utilized for stabilization decreases due to offsetting of the optical axis 4. Next, a case where the optical axis 4 and the center of the available area 411 of the image sensor 6 are made to coincide, that is, a case where the reference position of the image sensor 6 is the second reference position will be considered. At this time, the movable range of the available area 411 is represented by the circles 423a and 423b (radius: r4). It is clear that r3<r4, and r4=r2 under the condition that the circle 423a remains within the circle 420a. That is, it can be seen that the size of a range that can be used for stabilization can be increased by making the optical axis 4 and the center of the available area 411 of the image sensor 6 coincide. This leads to improvement of stabilization performance That is, in a case where cropping is not performed (entirety of the image sensor 6 is the available area), it is desirable that the center of the available area 411 be closer to the optical axis position with reference to information representing the position of the optical axis 4.

Next, referring to FIG. 6C, a case where the size of the available area is reduced will be considered. The center 405 of the available area of the image sensor is not related to the position of the optical axis 4 and is maintained at the mount center 404, that is, the image sensor 6 performs stabilization control with reference to the first reference position. Moreover, the available area 411 of the image sensor 6 is changed to only a part of the image sensor 6 (=is cropped). At this time, ranges surrounded by the straight lines 431, 432, 433, and 434 and the circles 430a, 430b, 430c, and 430d are included in the offset image circle 403. That is, when the stabilization mechanism 14 is freely operated in the movable range of the stabilization mechanism while keeping the center 405 of the available area of the image sensor to coincide with the mount center 404, the area 410 of the available area 411 positioned outside of the image circle 403 is not generated. Under such conditions, it is not necessary to set the reference position in accordance with the position of the optical axis 4, and as described above, a position that is favorable for another camera function or the like may be set as the reference position.

Referring to the flowchart of FIG. 1, a shooting operation performed by the image capture apparatus according to the present embodiment will be described.

Step S100 is a step of starting an operation. This operation is performed prior to an operation of the stabilization mechanism 14, and power-on of the camera 1 and switching of shooting modes correspond to this operation.

Step S110 is a step in which the camera system control circuit 5 acquires information from the lens unit 2 attached to the camera 1. The term "lens information" refers to information about the type of lens, the serial number of the lens, and the like.

Step S120 is a step of determining whether or not information representing the position of the optical axis and information representing an image circle diameter can be acquired from the lens unit, based on the lens information acquired from the lens unit. If it is determined that the information representing the position of the optical axis and the information representing the image circle diameter can be acquired from the lens unit, the process proceeds to step S130. If it is determined that the information cannot be acquired, the process proceeds to step S140. That is, in a case where the lens memory 17 of the lens has information representing the positions of the optical axes of individual lenses and the image circle diameter, the information is acquired via communication from the lens unit 2 in step S130. If not so, information representing the optical axis position and the image circle diameter is obtained based on information in the camera 1 in step S140. The information representing the image circle diameter may be information representing the image circle diameter (mm) itself or may be information representing light amount distribution that is the relationship between the image height and the light amount. Step S130 is a step of acquiring information representing the position of the optical axis and the image circle diameter from the lens memory 17. This information is stored in the lens memory 17 each time adjustment or the like is performed in the process of manufacturing the lens unit.

Step S140 is a step of acquiring information representing the position of the optical axis and information representing the image circle diameter from the memory unit 8 of the camera. A value provided in design or a value acquired by performing calibration in the field may be stored beforehand in the memory unit 8, and these values may be used as information representing the position of the optical axis or may be used as information representing the image circle diameter. As a value provided in design, information such that the mount center is the position of the optical axis or information such that a predetermined value is the image circle diameter may be used. One of the information representing the position of the optical axis and the information representing the image circle diameter may be obtained from the lens memory 17 of the lens unit 2, and the other may be obtained from the memory unit 8 of the camera. By performing steps S130 and S140, it is possible to obtain information representing the position of the optical axis of the imaging optical system and the image circle diameter from the optical axis information storing unit (the lens memory 17 or the memory unit 8).

Step S150 is a step of acquiring information representing the size of the available area of the image sensor. As described above, generally, the available area changes in accordance with the shooting mode. For example, in crop shooting and the like, an image is generated from a partial area on the image sensor. In such a case, because the available area changes, information of the available area is obtained. For example, information representing the shooting mode and information representing the available area may be associated with each other and stored in the memory unit 8, and the camera system control circuit 5 may acquire the information representing the available area from the information representing the shooting mode. The information representing the size of the available area may be information of the vertical width and the horizontal width of the available area, the diagonal-line length itself, or information representing the vertical width and the horizontal width, as long as the diagonal-line length can be acquired from the information. The unit may be the number of pixels or may be the length (mm).

Step S160 is a step of determining whether or not a part of the available area of the image sensor moves to the outside of the image circle, when the stabilization mechanism 14 is operated with the reference position of the image sensor 6 being the first reference position. If the area 410 is not generated, the process proceeds to the step S180. If the area 410 is generated, the process proceeds to step S170. Correspondence with the foregoing description is as follows: the process proceeds to step S170 in the case of the state shown in FIG. 5B, and the process proceeds to step S180 in the case of the state shown in FIG. 5D.

The determination in step S160 is performed based on the information representing the position of the optical axis of the imaging optical system acquired in step S130 or S140, the information representing the image circle diameter, and the information representing the size of the available area of the image sensor acquired in step S150. As a result, the center of the movement range of the image sensor (that is, the reference position) is set in accordance with the position of the optical axis, the image circle diameter, and the shooting mode of the image sensor.

In step S170, a position of the image sensor such that the distance between the center of the available area of the image sensor and the optical axis becomes smaller than that of a case where the image sensor is disposed at the first reference position (that is, the second reference position) is set as the reference position of the image sensor. The effect is that stabilization performance can be improved, as described above with reference to FIG. 6B. The second reference position is a position that is set based on the position of the optical axis.

In step S180, a position such that the center of the available area of the image sensor and the mount center coincide (that is, the first reference position) is set as the reference position of the image sensor. The effect is that the performances of various camera functions can be improved, as described above with reference to FIG. 6C. The first reference position is determined by the position of the mount center and is not influenced by the position of the optical axis 4.

Step S190 is a step of setting the operation range of the available area of the image sensor. The operation area is set based on the reference position set in steps S170 and S180, the positional relationship between the image circle and the available area, the mechanical movable range of the stabilization mechanism 14, and the like.

Step S200 is a step of finishing the operation, and, through the steps described above, the reference position and the operation area of the available area of the image sensor are set.

By performing the process described above, for example, when the shooting mode is changed from the video mode, in which the diagonal-line length of the available area is the second value, or from the crop shooting mode to the still image mode, in which the diagonal-line length of the available area of the image sensor is the first value, the reference position of the image sensor moves in accordance with the change. As heretofore described, with the present invention, it is possible to provide an image-capture apparatus that can obtain appropriate stabilization and camera functions in accordance with the state of the imaging optical system and the shooting mode.

Modifications

Figure 1:
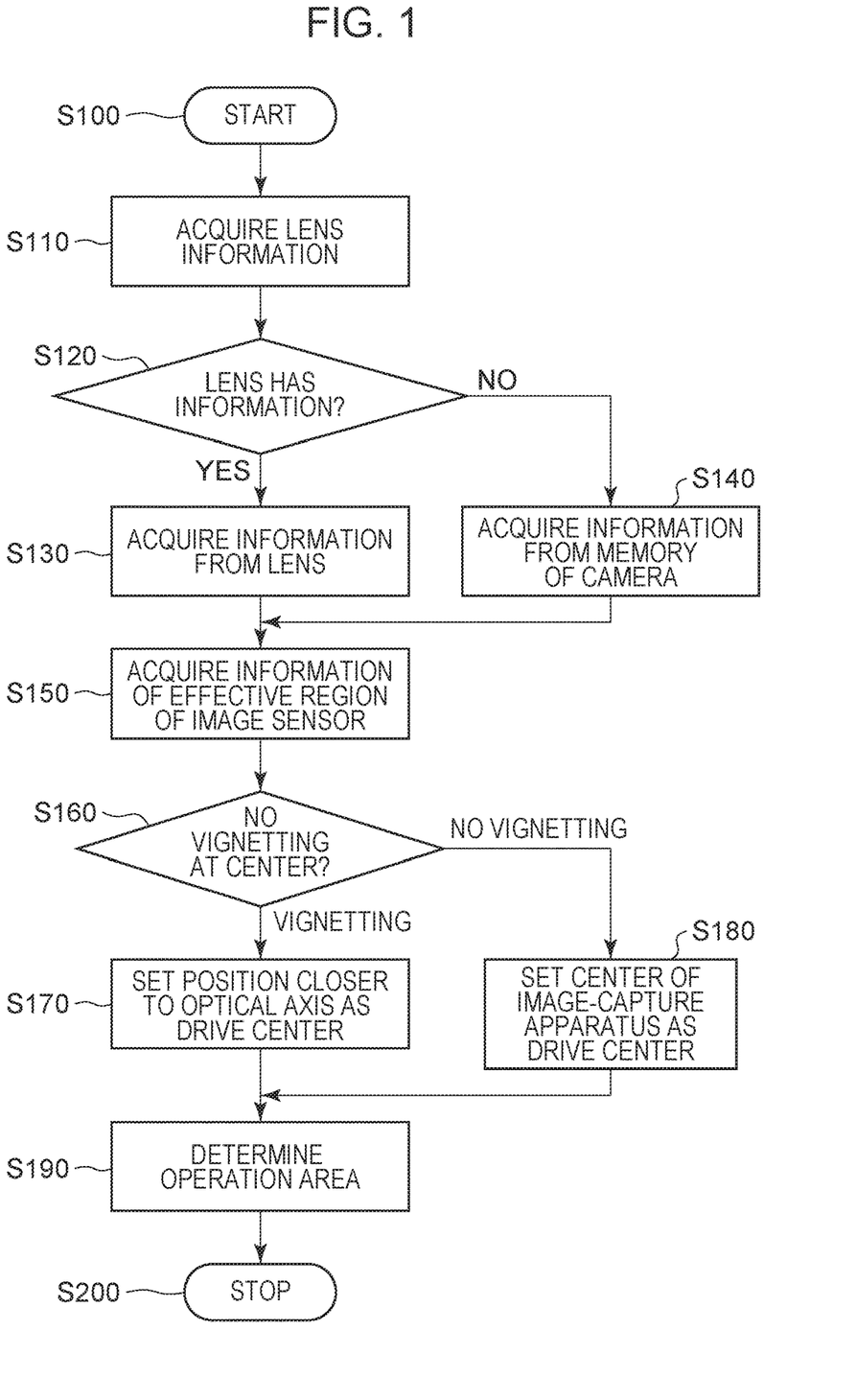
FIG. 1 is a flowchart illustrating a stabilization control process according to an embodiment.

In the process illustrated in FIG. 1, which of the first reference position and the second reference position is the reference position is selected based on the position of the optical axis, the image circle diameter, and the diagonal-line length of the available area; and the selected reference position is set as the reference position of the image sensor. However, which of the reference positions is to be used may be selected simply based on the image circle diameter and the diagonal-line length of the available area. To be specific, when the difference between the diameter of the image circle and the diagonal-line length of the available area is larger than a threshold, it is considered that the margin of the image circle relative to the available area is large and the area 410 is not generated even when the optical axis is offset due to a manufacturing error or the like, and therefore the first reference position is determined as the reference position. On the other hand, when the difference is smaller than or equal to the threshold, the margin of image circle is not large and the area 410 may be generated depending on the offset amount of the optical axis, and therefore the second reference position is determined as the reference position. In this case, when the difference is larger than the threshold, it is not necessary to acquire information representing the position of the optical axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-116526, filed on Jun. 24, 2019, which is hereby incorporated by reference herein in its entirety.

What is claimed is:

1. A stabilization control apparatus comprising at least one processor, wherein the at least one processor functions as:
a mode setting unit configured to set one of a plurality of shooting modes including a first shooting mode and a second shooting mode, wherein a diagonal-line length of an available area of an image sensor in the first shooting mode is a first value, wherein the image sensor photoelectrically converts a subject image formed by an imaging optical system and outputs an image signal, and the diagonal-line length of the available area is a second value smaller than the first value in the second shooting mode;

a reference position setting unit configured to set a reference position of the image sensor when a correction amount for image stabilization is 0; and a control unit configured to move the image sensor from the reference position in a plane perpendicular to an optical axis of the imaging optical system, based on a shake, wherein the reference position set by the reference position setting unit when the first shooting mode is set by the mode setting unit differs from the reference position set by the reference position setting unit when the second shooting mode is set by the mode setting unit, and wherein the reference position setting unit sets the reference position so that a distance between a position of the optical axis and the reference position is shorter when the diagonal-line length of the available area of the image sensor is the first value than when the diagonal-line length is the second value.

2. The stabilization control apparatus according to claim 1, wherein, when the shooting mode set by the mode setting unit is changed from the second shooting mode to the first shooting mode, the reference position setting unit changes the reference position of the image sensor.

3. The stabilization control apparatus according to claim 1, wherein the at least one processor further functions as:
an acquisition unit configured to acquire optical information of the imaging optical system,
wherein the reference position setting unit sets the reference position based on the shooting mode set by the mode setting unit and the optical information of the imaging optical system.

4. The stabilization control apparatus according to claim 3, wherein the reference position setting unit determines, based on the shooting mode set by the mode setting unit, whether or not to set the reference position based on the optical information of the imaging optical system.

5. The stabilization control apparatus according to claim 4, wherein the optical information of the imaging optical system includes information representing the optical axis of the imaging optical system, and
wherein the reference position setting unit determines, based on the shooting mode set by the mode setting unit, whether or not to set the reference position based on the information representing the optical axis.

6. The stabilization control apparatus according to claim 5, wherein the reference position setting unit determines, based on information of the available area of the image sensor and the information representing the optical axis of the imaging optical system, whether or not to set the reference position based on the information representing the optical axis.

7. The stabilization control apparatus according to claim 3, wherein the position of the optical axis is acquired based on the optical information of the imaging optical system.

8. The stabilization control apparatus according to claim 3, wherein the reference position setting unit sets the reference position so that a distance between a position of the optical axis based on the optical information of the imaging optical system and the reference position is shorter when a difference between the diagonal-line length of the available area of the image sensor and a diameter of an image circle of the imaging optical system is smaller than or equal to a threshold than when the difference between the diagonal-line length of the available area of the image sensor and the diameter of the image circle of the imaging optical system is larger than the threshold.

9. The stabilization control apparatus according to claim 1, wherein the reference position setting unit sets a movement range of the image sensor based on the shooting mode set by the mode setting unit.

10. The stabilization control apparatus according to claim 1, wherein the available area of the image sensor is an area that is used to generate the image signal to be recorded.

11. The stabilization control apparatus according to claim 1, wherein the first shooting mode is a still image shooting mode, and the second shooting mode is a video shooting mode.

12. The stabilization control apparatus according to claim 1, wherein the first shooting mode is a still image shooting mode that records an image corresponding to a first area on the image sensor, the first area having a diagonal-line length that is the first value, and
wherein the second shooting mode is a still image shooting mode that records an image corresponding to a second area on the image sensor, the second area having a diagonal-line length that is the second value.

13. The stabilization control apparatus according to claim 1, wherein a distance between an optical axis position of the imaging optical system and the reference position set by the reference position setting unit differs depending on whether the first shooting mode or the second shooting mode has been set by the mode setting unit.

14. An image capture apparatus comprising:
an image sensor that photoelectrically converts a subject image formed by an imaging optical system and outputs an image signal;
at least one processor functions as:
    a mode setting unit configured to set one of a plurality of shooting modes including a first shooting mode and a second shooting mode, wherein a diagonal-line length of an available area of the image sensor is a first value in the first shooting mode, and the diagonal-line length of the available area is a second value smaller than the first value in the second shooting mode;
    a reference position setting unit configured to set a reference position of the image sensor when a correction amount for image stabilization is 0;
    a control unit configured to move the image sensor from the reference position in a plane perpendicular to an optical axis of the imaging optical system, based on a shake,
    wherein the reference position set by the reference position setting unit when the first shooting mode is set by the mode setting unit differs from the reference position set by the reference position setting unit when the second shooting mode is set by the mode setting unit; and
    an imaging control unit configured to control image capture by the image sensor,
wherein the imaging control unit controls image capture by the image sensor based on the shooting mode set by the mode setting unit,
wherein the reference position setting unit sets the reference position so that a distance between a position of the optical axis and the reference position is shorter when the diagonal-line length of the available area of the image sensor is the first value than when the diagonal-line length is the second value.

15. An image capture apparatus comprising at least one processor or circuit, wherein the at least one processor functions as:
an acquisition unit configured to acquire information representing a size of an available area of an image sensor that photoelectrically converts a subject image formed by an imaging optical system and outputs an image signal;
a setting unit configured to set a reference position based on the information representing the size of the available area of the image sensor acquired by the acquisition unit, the reference position being a position of the image sensor when a correction amount for image stabilization is 0; and
a control unit configured to move the image sensor from the reference position based on a shake, in a plane perpendicular to an optical axis of the imaging optical system,
wherein the setting unit sets the reference position so that a distance between a position of the optical axis and the reference position is shorter when a diagonal-line length of the available area of the image sensor is a first value than when the diagonal-line length is a second value.

16. A stabilization control method comprising:
setting one of a plurality of shooting modes including a first shooting mode and a second shooting mode, in the first shooting mode, a diagonal-line length of an available area of an image sensor that photoelectrically converts a subject image formed by an imaging optical system and outputs an image signal, is a first value, in the second shooting mode, the diagonal-line length of the available area of the image sensor is a second value that is smaller than the first value;
setting a reference position of the image sensor when a correction amount for image stabilization is 0; and
controlling to move the image sensor from the reference position in a plane perpendicular to an optical axis of the imaging optical system, based on a shake,
wherein the reference position set when the first shooting mode is set in the setting of a shooting mode differs from the reference position set when the second shooting mode is set in the setting of a shooting mode, and
wherein the reference position is set so that a distance between a position of the optical axis and the reference position is shorter when the diagonal-line length of the available area of the image sensor is the first value than when the diagonal-line length is the second value.

* * * * *